No. 730,123. PATENTED JUNE 2, 1903.
F. H. HUDSON.
PORTABLE DEVICE FOR CENTERING SHAFTING.
APPLICATION FILED JAN. 28, 1903.
NO MODEL.
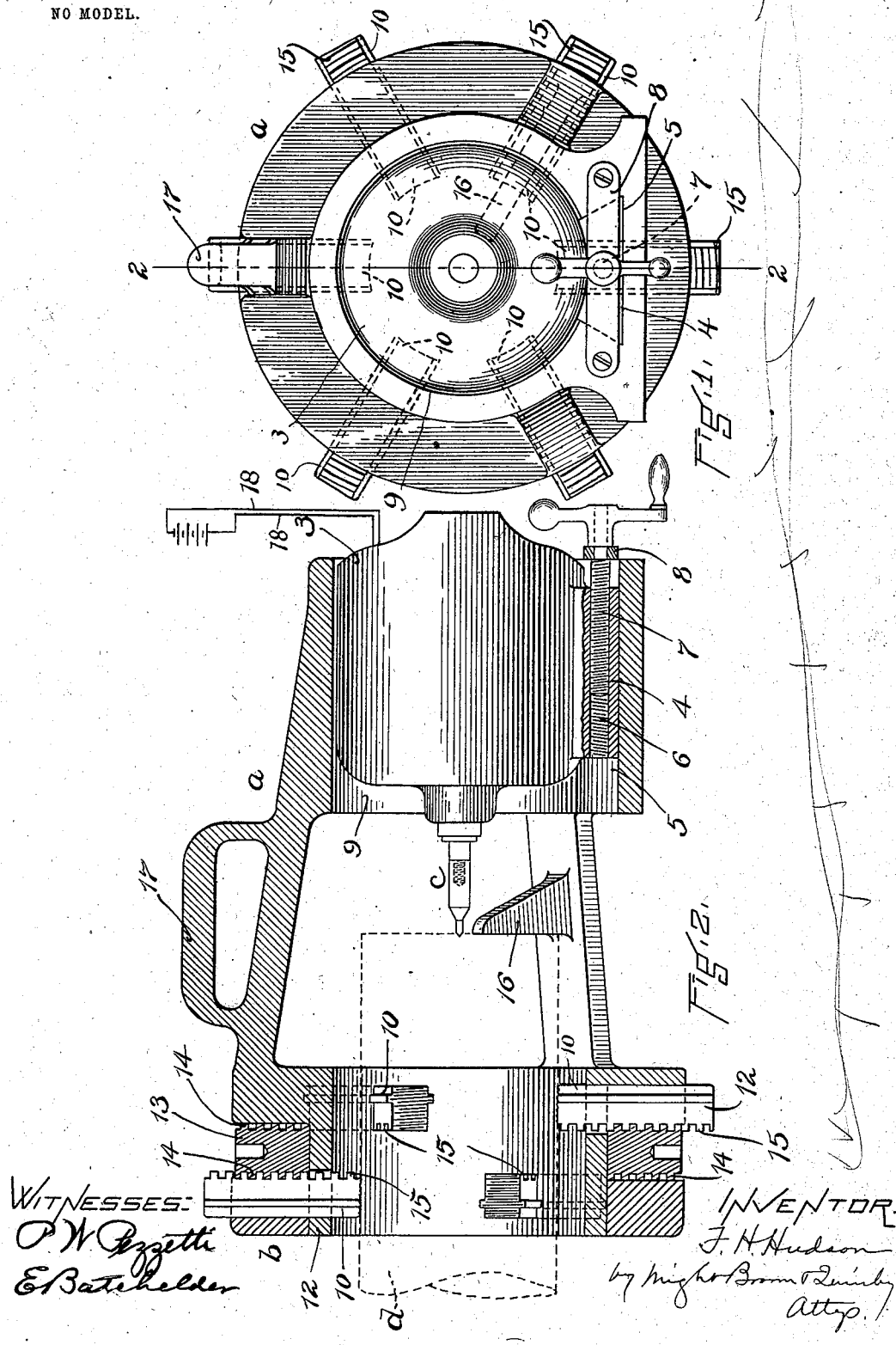

No. 730,123.                                          Patented June 2, 1903.

UNITED STATES PATENT OFFICE.

FRANK H. HUDSON, OF LYNN, MASSACHUSETTS, ASSIGNOR OF ONE-HALF TO HARRY O. RUSS, OF SWAMPSCOTT, MASSACHUSETTS.

PORTABLE DEVICE FOR CENTERING SHAFTING.

SPECIFICATION forming part of Letters Patent No. 730,123, dated June 2, 1903.

Application filed January 28, 1903. Serial No. 140,845. (No model.)

*To all whom it may concern:*

Be it known that I, FRANK H. HUDSON, of Lynn, in the county of Essex and State of Massachusetts, have invented certain new and useful Improvements in Portable Devices for Centering Shafting, of which the following is a specification.

This invention relates to means for forming an orifice in the center of the end of a shaft or bar which is afterward to be turned or ground; and it has for its object to provide a portable device of this character adapted to be clamped upon or engaged with an end portion of a bar or a length of shafting and to support and guide a drill in line with the longitudinal center of the piece of work, so that the device as a whole can be readily moved about and applied, if desired, to an end of a bar or a length of shafting lying in a pile, the device as a whole being conformable to the position of the work wherever the latter may be located.

The invention consists in the improvements which I will now proceed to describe and claim.

Of the accompanying drawings, forming a part of this specification, Figure 1 represents an end elevation of a centering device embodying my invention. Fig. 2 represents a section on line 2 2 of Fig. 1.

The same reference characters indicate the same parts in both figures.

My improved centering device comprises a holder, which as a whole is indicated by the reference-letter $a$. At one end of the holder is a chuck, which as a whole is indicated by $b$, and at the other end of the holder is a rotary drill $c$, which is arranged in longitudinal alinement with a length of shafting or other piece of work $d$, held by the chuck. The chuck is adapted to bear on and grasp the work $d$ at a sufficient number of points to engage the holder $a$ and its attachments firmly with the shaft, so that the entire device will be supported by the shaft, the drill $c$ being thus held in longitudinal alinement with the center of the work and adapted to form a central orifice in the end thereof. The drill may be mounted and rotated in any suitable way and is longitudinally movable toward and from the chuck, so that it is adapted while rotating to enter and leave the work. I prefer to provide an electric motor, of which 3 represents the casing, and 18 18 the circuit-wires. I do not show the interior of the motor, as any of several well-known forms of electric motor may be used in this relation, current being supplied to the motor by flexible wires (not shown) and caused to rotate a rotary armature or other equivalent device connected with the drill $c$. The motor-casing and the parts carried thereby constitute a drill-holder and are adjustable to move the drill lengthwise toward and from the chuck and the work held thereby. I have here shown the motor-casing provided with a dovetail slide 4, movable in a dovetail guide 5, formed in the holder $a$. The slide 4 has an interally-threaded longitudinal orifice 6, with which is engaged a feed-screw 7, journaled in a bearing 8, fixed to the holder. The rotation of said screw projects or retracts the motor and drill. The motor is contained in a socket or guide 9, formed for its reception in the holder $a$ at the end opposite the chuck, the guide 9 and the chuck being separated from each other, as shown, so that the drill and the end of the shaft $d$ are exposed to view between said parts.

The chuck $b$ may be of any suitable construction. It is here shown as comprising a plurality of radial jaws 10, movable through slots in a sleeve 12, formed on the holder $a$ and adjusted simultaneously by means of an adjusting-ring 13, which has scroll-shaped teeth 14 on its opposite sides, said teeth engaging corresponding teeth 15, formed in the adjacent sides of the chuck-jaws 12. Said jaws are preferably arranged in two series, the jaws of one series occupying a different plane from the jaws of the other series, as shown in Fig. 2, this arrangement giving the chuck an extended bearing on the work and enabling the engagement of the jaws with the work to firmly support the holder and its attachments, with the drill $c$, in alinement with the longitudinal center of the work.

The above-described device may be operated as follows: A length of shafting $d$ being drawn out from one end of a pile of similar lengths, the chuck end of the holder is moved upon the projecting end of the said length and the jaws 10 are adjusted inwardly until they come to a bearing on the periphery of the piece of work. The current is then applied to the motor and the drill, which is now in alinement with the longitudinal center of the work, is rotated, the motor and drill being advanced by means of the feed-screw until the drill has formed an orifice of the desired depth and shape in the end of the work. The motor and drill may then be retracted, the chuck-jaws disengaged from the work, and the device removed and applied to another piece of work.

I do not limit myself to the foregoing means for rotating the drill, it being obvious that means may be provided for rotating the drill by hand without departing from the spirit of my invention.

The extent to which the piece of work enters the holder may be determined by means of a stop 16, as shown in Fig. 2. Said stop is located between the chuck and the motor-guide and prevents injurious contact between the drill and the end of the shaft when the device is being applied to the shaft.

17 represents a handle for convenience in manipulating the device.

I claim—

1. A portable combined centering appliance and drilling device comprising a holder having means for securing it to the end of the rod or bar, and a drill and motor mounted in said holder and held thereby in centered position opposite the end of such rod or bar.

2. A portable combined centering appliance and drilling device comprising a holder having means for securing it to the end of the rod or bar, and a drill and motor mounted in said holder and held thereby in centered position opposite the end of such rod or bar, means being provided for adjusting the motor and drill longitudinally of the holder.

3. A centering device comprising a portable holder having at one end a shaft-receiving sleeve and at the other end a motor-receiving socket or guide, radial jaws extending through said sleeve and adapted to bear simultaneously on a shaft inserted therein, means for simultaneously adjusting said jaws, a motor engaged with said socket or guide and provided with a drill, and means for moving the motor and drill toward and from the shaft or bar held by said jaws.

In testimony whereof I have affixed my signature in presence of two witnesses.

FRANK H. HUDSON.

Witnesses:
C. F. BROWN,
A. D. HARRISON.